United States Patent [19]

Vald'via

[11] Patent Number: 5,407,026
[45] Date of Patent: Apr. 18, 1995

[54] GOLF CLUB GRIP INSTALLING APPARATUS

[75] Inventor: Guillermo G. Vald'via, Phoenix, Ariz.

[73] Assignee: Karsten Manufacturing Corporation, Phoenix, Ariz.

[21] Appl. No.: 163,484

[22] Filed: Dec. 7, 1993

[51] Int. Cl.⁶ .............................................. F16N 23/00
[52] U.S. Cl. .......................................... 184/82; 184/83;
184/102; 118/264; 118/317; 118/408;
118/DIG. 10; 118/DIG. 11
[58] Field of Search ....................... 184/74, 75, 80, 82,
184/102; 118/254, 264, 710, 317, 408, DIG. 10,
DIG. 11, DIG. 13; 29/235, 270

[56] References Cited

U.S. PATENT DOCUMENTS

| | | | |
|---|---|---|---|
| 1,102,965 | 7/1914 | Smith | 118/264 |
| 2,708,305 | 5/1955 | Ohl . | |
| 3,889,628 | 6/1975 | Usab | 118/408 |
| 4,185,375 | 1/1980 | Brown . | |
| 4,313,250 | 2/1982 | Sokolowski | 29/235 |
| 4,356,218 | 10/1982 | Chiu et al. | 118/264 |
| 4,466,166 | 8/1984 | Hogarth . | |
| 4,523,363 | 6/1985 | Mizutani et al. . | |
| 4,653,170 | 3/1987 | Kelson . | |
| 4,677,872 | 7/1987 | Nishida et al. . | |
| 4,729,256 | 3/1988 | Kelson . | |
| 4,899,428 | 2/1990 | Hsu . | |
| 5,074,023 | 12/1991 | Decker et al. . | |
| 5,293,960 | 3/1994 | Majerowicz et al. | 184/102 |

Primary Examiner—Thomas E. Denion
Attorney, Agent, or Firm—Darrell F. Marquette; Herbert E. Haynes, Jr.

[57] ABSTRACT

Apparatus for installing grips on golf club shafts includes a grip lubricating device and a golf club shaft lubricating device. The grip lubricating device utilizes a wick which wipes against an inner surface of a grip. The wick is wettable by a lubricant that is held in a container. The golf club shaft lubricating device utilizes an absorbent, sponge-like liner that wipes against an outer surface of one end of a golf club shaft. Control valves regulate flow of lubricant from the container so that a controlled amount of lubricant is applied to the inner surface of the grip and to the outer surface of the one end of the golf club shaft.

17 Claims, 3 Drawing Sheets and 5,407,026

GOLF CLUB GRIP INSTALLING APPARATUS

BACKGROUND OF THE INVENTION

This invention relates generally to golf equipment and, in particular, to apparatus for installing grips on golf club shafts.

Typically, golf clubs consist of three main parts including a shaft, a club head and a grip. The club head is attached to a lower end of the shaft, and the grip is installed on an upper end of the shaft. The grip is usually made of an elastomeric material such as rubber. The shaft upper end is spirally wrapped with double sided tape, and then the wrapped end of the shaft is dipped into a lubricant that will temporarily break down the exposed adhesive on the tape. Lubricant is poured into the open end of the grip, and then the grip is slid onto the tape wrapped upper end of the shaft. After the grip is properly aligned on the shaft, the lubricant evaporates and the adhesive on the tape is reactivated to secure the grip to the shaft.

SUMMARY OF THE INVENTION

The present invention provides apparatus for installing a grip on a golf club shaft. The apparatus includes a grip lubricating device for applying a controlled amount of lubricant to an inner surface of the grip, and a golf club shaft lubricating device for applying a controlled amount of lubricant to an outer surface of one end of the golf club shaft. A container holds lubricant that is supplied to the grip lubricating device and to the golf club shaft lubricating device. A first supply line connects the container to the grip lubricating device, and a second supply line connects the container to the golf club shaft lubricating device.

The grip lubricating device includes a first cylinder into which a grip may be inserted, and a pipe disposed inside the first cylinder onto which the grip may be slidably mounted. A wick is disposed in one end of the pipe for wiping against the inner surface of the grip. The wick is wettable by the lubricant. A control valve is utilized for regulating flow of lubricant from the container into the pipe via the first supply line.

The golf club shaft lubricating device includes a second cylinder into which one end of a golf club shaft may be inserted, and an absorbent liner disposed in the second cylinder for wiping against the outer surface of the one end of the golf club shaft. The absorbent liner is wettable by the lubricant. A control valve is utilized for regulating flow of lubricant from the container into the second cylinder via the second supply line.

DESCRIPTION OF THE PREFERRED EMBODIMENT

Figure 1:
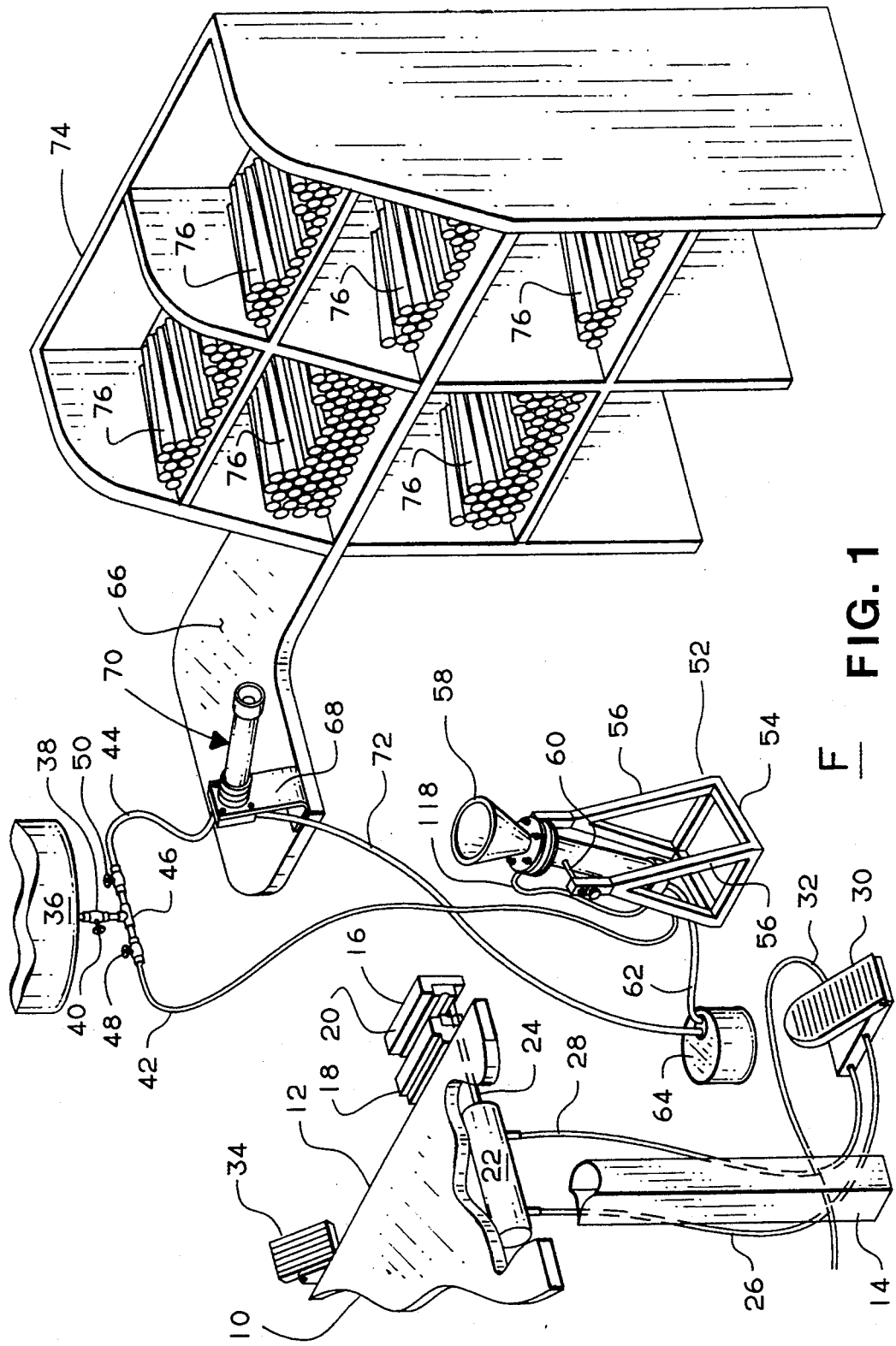
FIG. 1 is a perspective of apparatus for installing grips on golf clubs according to the present invention.

Referring to FIG. 1, a table 10 has a top 12 supported by legs 14 above a floor F. A clamping device 16 mounted along one side of the table top 12 includes a fixed jaw 18 and a movable jaw 20. A pneumatic cylinder 22 mounted underneath the table top 12 has its piston rod 24 connected to the movable jaw 20 of the clamping device 16. Hoses 26, 28 connect the pneumatic cylinder 22 to a foot pedal 30, and another hose 32 connects the foot pedal 30 to a source of compressed air (not shown). A block 34 is pivotally mounted along the same side of the table 10 as the clamping device 16.

Supported at a height of several feet above the table top 12 is a container 36 for holding a suitable liquid lubricant such as an aliphatic hydrocarbon. A primary supply line 38 extends from the bottom of the container 36, and a shut off valve 40 is installed in the supply line 38. Secondary supply lines 42, 44 are connected to the supply line 38 by a tee connection 46, and shut off valves 48, 50 are provided in the supply lines 42, 44. Lubricant will flow from the container 36 through the supply lines 38, 42 and 44 due to gravity.

Resting on the floor F below the table top 12 is a stand 52 which has a rectangular base 54 and two upstanding triangular sides 56. The stand 52 pivotally supports a golf club shaft lubricating device 58 on a pair of rods 60 that extend inwardly from the sides 56 of the stand 52. The secondary supply line 42 is connected to the golf club shaft lubricating device 58 as described later, and a drain hose 62 extends from the shaft lubricating device 58 into a receptacle 64 on the floor F.

Mounted on one end of a work bench 66 is a bracket 68 to which is rigidly attached a grip lubricating device 70. The secondary supply line 44 is connected to the grip lubricating device 70 as described later, and a drain hose 72 extends from the grip lubricating device 70 into the receptacle 64. A cabinet 74 is arranged at the other end of the work bench 66 for holding an inventory of grips 76 of various sizes and types.

Figure 2:
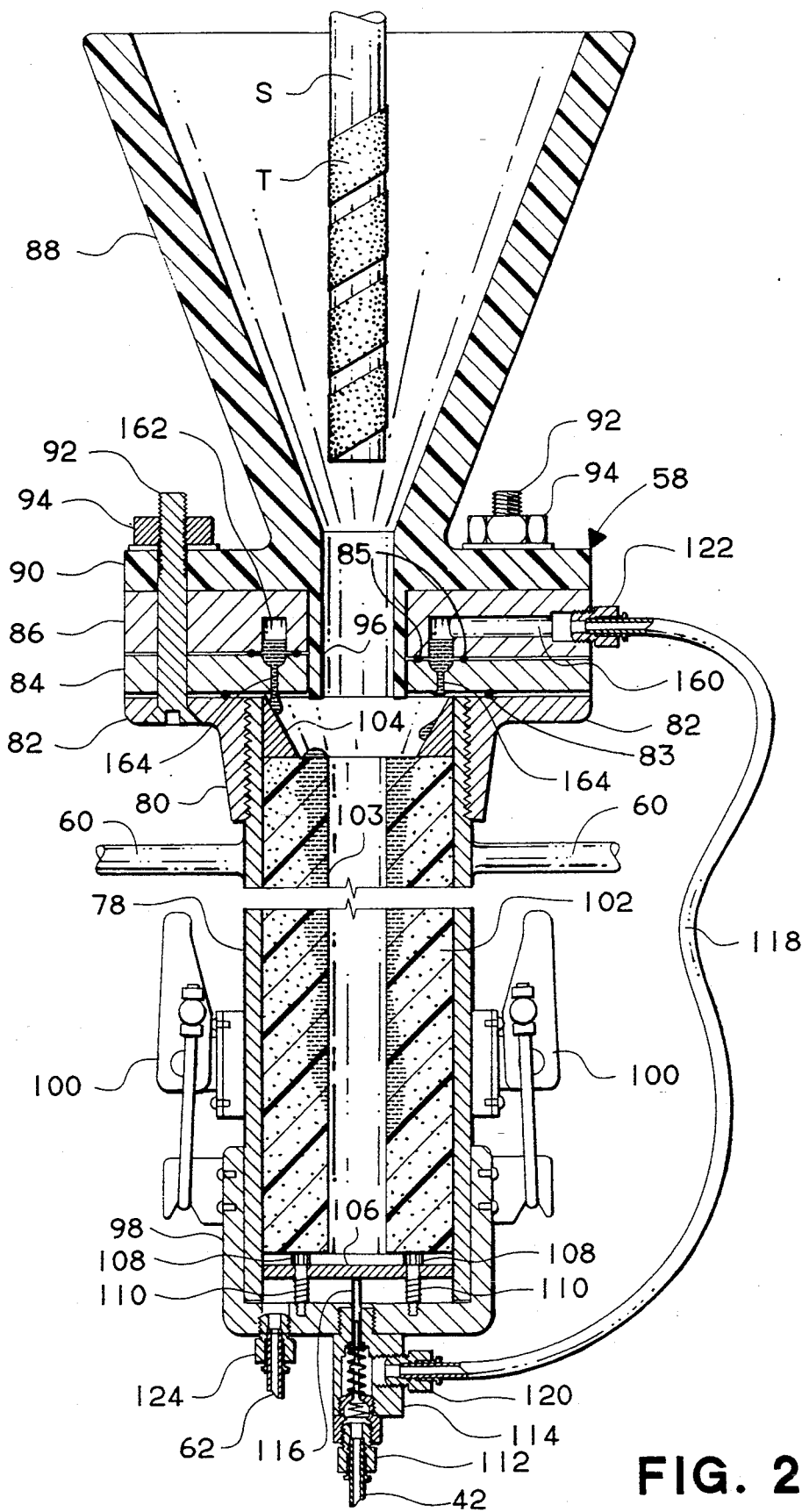
FIG. 2 is an enlarged cross-sectional view of a golf club shaft lubricating device used in the apparatus shown in FIG. 1.

Referring now to FIG. 2, the golf club shaft lubricating device 58 includes a cylinder 78 to which the rods 60 are fixed. The top end of the cylinder 78 above the pins 60 is threaded in order to receive a fitting 80 that has an annular flange 82. A lower disc 84 and an upper disc 86 are supported on the flange 82 of the fitting 80, and a funnel-shaped guide 88 has an annular flange 90 that rests on the upper disc 86. An O-ring seal 83 is disposed between the lower disc 84 and the fitting flange 90; and a pair of O-ring seals 85 are disposed between the upper and lower discs 84, 86. A plurality of bolts 92 extend through aligned holes in the fitting 80, the discs 84 and 86, and the guide 88, and are secured by nuts 94. The guide 88 has a lower tubular end 96 that fits through central holes in the upper disc 86 and the lower disc 84.

A removable cap 98 is provided on the bottom end of the cylinder 78 and is secured to the cylinder 78 by a pair of conventional locking mechanisms 100. Disposed inside the cylinder 78 is an absorbent, sponge-like liner 102. An insert 104 is arranged between the upper end of the liner 102 and the lower disc 84, and a plate 106 is arranged between the lower end of the liner 102 and the cap 98. Two small pins 108 mounted in the cap 98 extend through holes in the plate 106 and engage the lower end of the liner 102. Springs 110 carried by the pins 108 urge the plate 106 in an upward direction in FIG. 2.

Lubricant is delivered to the shaft lubricating device 58 via the supply line 42 which is attached to a port 112 on a flow control valve 114. It is understood that the control valve 114 is available from Clippard as part no. MJV2. The control valve 114 has an actuating stem 116 that is arranged for engagement by the plate 106. A delivery line 118 is connected at one end to another port 120 on the control valve 114 while the other end of the delivery line 118 is connected to a port 122 on the upper disc 86. The drain hose 62 is connected to a port 124 on the cap 98.

Figure 3:
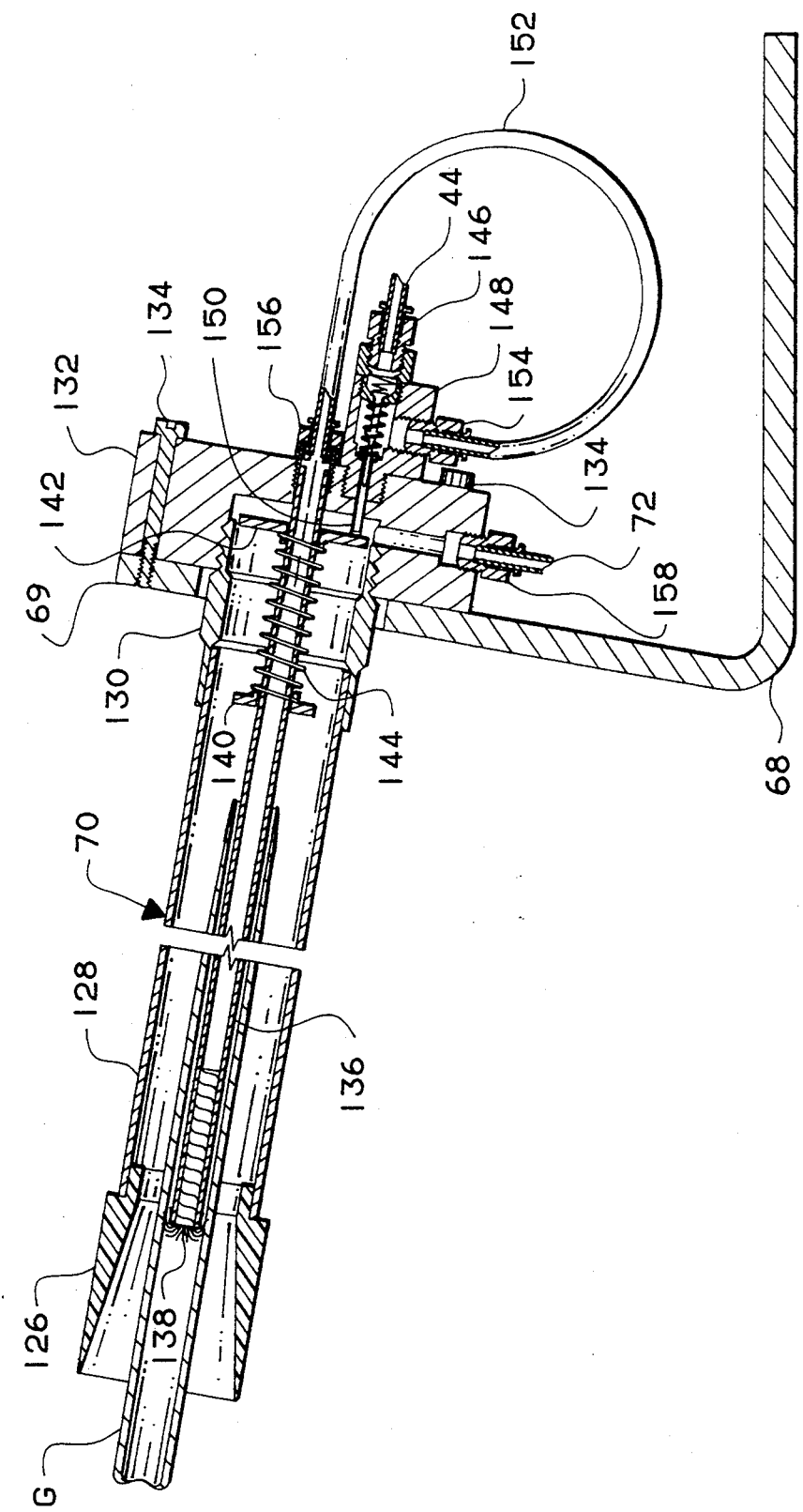
FIG. 3 is an enlarged cross-sectional view of a grip lubricating device used in the apparatus shown in FIG. 1.

Referring now to FIG. 3, the golf club grip lubricating device 70 includes a guide 126 secured to one end of a cylinder 128, and a fitting 130 secured to the other end of the cylinder 128. The fitting 130 is threaded into a block 132 which is attached to an upper leg 69 of the bracket 68 by four screws 134. A pipe 136 is rigidly mounted at one end in the block 132 while a wick 138 is inserted in the other end of the pipe 136. A small ring 140 and a large ring 142 are slidably mounted on the pipe 136, and a spring 144 is fastened at its ends between the rings 140, 142.

Lubricant is delivered to the grip lubricating device 70 via the supply line 44 which is attached to a port 146 on a flow control valve 148 that is identical to the flow control valve 114 on the shaft lubricating device 58. The control valve 148 has an actuating stem 150 that may be engaged by the large ring 142. A delivery line 152 is connected at one end to another port 154 on the valve 148 while the other end of the delivery line 152 is connected to a port 156 on the block 132. The drain hose 72 is connected to a port 158 on the block 132.

It will be understood that when the shut: off valves 40, 48 and 50 are opened, lubricant from the container 36 quickly fills the supply lines 38, 42 and 44 due to gravity since the container 36 is located at a higher elevation above the floor F than both the shaft lubricating device 58 and the grip lubricating device 70. No pumps are utilized to deliver lubricant from the container 36.

When it is desired to install a grip on a golf club shaft, the end portion of the shaft S opposite the club head is wrapped with double-sided adhesive tape T in a spiral fashion. The taped end of the shaft S is manually inserted into the guide 88 of the shaft lubricating device 58 and pushed downwardly through the lower end 96 thereof. Further downward movement of the shaft S causes its taped end portion to enter a central passage 103 in the liner 102. The shaft S is moved downward until its taped end portion engages the plate 106 and moves the plate 106 downwardly in the cylinder 78 thereby compressing the springs 110. As the plate 106 moves downwardly in the cylinder 78, it pushes the actuating stem 116 into the flow control valve 114 thus opening the valve 114. With the valve 114 opened, lubricant is delivered from the supply line 42 through the ports 112, 120 and the delivery line 118 into the port 122. Lubricant flows through a radial passage 160 in the upper disc 86 into an annular passage 162 in the upper disc 86. From the annular passage 162, lubricant flows through a plurality of weep holes 164 formed in the lower disc 84 and then drips onto the insert 104. Lubricant runs off the insert 104 onto the liner 102 which becomes saturated. The saturated liner 102 wipes against and lubricates the taped end portion of the shaft S thereby temporarily deactivating the adhesive on the tape T.

As the shaft S is pulled upwardly out of the lubricating device 58, the springs 110 urge the plate 106 upwardly thereby allowing the control valve 114 to automatically close. Any excess lubricant which collects in the cap 98 flows out the port 124 through the drain hose 62 into the receptacle 64. The shaft S is clamped in the clamping device 16 with the club head resting against the block 34 in conventional manner.

Simultaneously, a grip G is inserted into the guide 126 of the grip lubricating device 70 such that the grip G enters the cylinder 128 and fits over the end of the pipe 136 holding the wick 138. As the grip G is manually pushed into the cylinder 128, its open end slidably receives the pipe 136. When the grip G is pushed further into the cylinder 128, its open end engages the ring 140 thereby moving the ring 140 along the pipe 136. The movement of the ring 140 moves the plate 142 (toward the right in FIG. 3) against the valve stem 150 to open the valve 148 so that lubricant is allowed to flow from the port 146 through the valve 148 into the port 158. Then the lubricant flows through the hose 152 into the port 156 where it enters the pipe 136. The lubricant fills the pipe 136 and wets the wick 138 which wipes against the inner wall of the grip G. The grip G is lubricated for installation on the shaft S.

With the shaft S clamped in the clamping device 16 as already described, the grip G is slidably mounted on the taped end portion of the shaft S. The grip G is properly aligned on the shaft S. The lubricant quickly evaporates so that the grip G is secured to the shaft S by the adhesive on the tape T.

It will be understood that if the adhesive on the tape T is of the water soluble type, then water may be used as the lubricant in the shaft lubricating device 58 and in the grip lubricating device 70 instead of the aliphatic hydrocarbon.

What is claimed is:

1. Apparatus for installing a grip on a golf club shaft, said apparatus comprising:
    a grip lubricating device for applying a controlled amount of lubricant to an inner surface of said grip, said grip lubricating device including a first cylinder into which said grip is inserted and a pipe disposed inside said first cylinder onto which said grip may be slidably mounted, a wick disposed in one end of said pipe for wiping against said inner surface of said grip, said wick being wettable by said lubricant; and
    a golf club shaft lubricating device, separate from said grip lubricating device, for applying a controlled amount of lubricant to an outer surface of one end of said golf club shaft, said golf club shaft lubricating device including a second cylinder into which one end of said golf club shaft is inserted and an absorbent liner disposed inside said second cylinder for wiping against said outer surface of said one end of said golf club shaft, said absorbent liner being wettable by said lubricant.

2. The apparatus of claim 1, further comprising a container holding lubricant that is supplied to said grip lubricating device and said golf club shaft lubricating device.

3. The apparatus of claim 2, further comprising a first supply line connecting said container to said grip lubricating device, and a second supply line connecting said container to said golf club shaft lubricating device.

4. The apparatus of claim 3, wherein said grip lubricating device comprises a control valve for regulating flow of lubricant from said container into said pipe via said first supply line.

5. The apparatus of claim 4, wherein said control valve comprises an actuating stem for opening said control valve.

6. The apparatus of claim 5, wherein said grip lubricating device further comprises a first plate movable along said pipe for engagement with said actuating stem of said control valve.

7. The apparatus of claim 6, wherein said grip lubricating device further comprises a second plate movable along said pipe and connected to said first plate by a spring, said second plate being engageable by one end of said grip for moving said first plate into engagement with said actuating stem in order to open said control valve.

8. The apparatus of claim 7, wherein said grip lubricating device further comprises a delivery line connecting said control valve and said pipe for filling said pipe with lubricant when said control valve is opened.

9. The apparatus of claim 8, wherein said grip lubricating device further comprises a drain hose connected thereto for removing excess lubricant.

10. The apparatus of claim 9, wherein said grip lubricating device further comprises a guide mounted on one end of said first cylinder for guiding said grip into said first cylinder.

11. The apparatus of claim 3, wherein said golf club shaft lubricating device further comprises a control valve for regulating flow of lubricant from said container into said second cylinder via said second supply line.

12. The apparatus of claim 11, wherein said control valve further comprises an actuating stem for opening said control valve.

13. The apparatus of claim 12, wherein said golf club shaft lubricating device further comprises a plate movable inside said cylinder for engagement with said actuating stem of said control valve, and wherein said plate is engageable by said one end of said golf club shaft in order to open said control valve.

14. The apparatus of claim 13, wherein said golf club shaft lubricating device further comprises a delivery line connecting said control valve and said second cylinder for discharging lubricant into said second cylinder in order to saturate said absorbent liner.

15. The apparatus of claim 14, wherein said golf club shaft lubricating device further comprises an upper disc and a lower disc supported adjacent one end of said second cylinder, said delivery line being connected to said upper disc for delivering lubricant through a passage in said upper disc.

16. The apparatus of claim 15, wherein said lower disc comprises a plurality of weep holes for directing lubricant from said passage in said upper disc onto said absorbent liner.

17. The apparatus of claim 16, wherein said golf club shaft lubricating device further comprises a guide member supported on said upper disc for guiding said one end of said golf club shaft into said second cylinder.

* * * * *